(12) United States Patent
Harris et al.

(10) Patent No.: US 8,213,444 B1
(45) Date of Patent: Jul. 3, 2012

(54) ADAPTIVELY ADJUSTING JITTER BUFFER CHARACTERISTICS

(75) Inventors: David Harris, Pleasanton, CA (US); James J. Pan, Cupertino, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1443 days.

(21) Appl. No.: 11/364,245

(22) Filed: Feb. 28, 2006

(51) Int. Cl.
*H04L 12/28* (2006.01)

(52) U.S. Cl. ....................... 370/412; 370/516

(58) Field of Classification Search .................. 370/464, 370/498, 503, 516, 351, 389, 412–429, 229–235
See application file for complete search history.

(56) References Cited

U.S. PATENT DOCUMENTS

| | | | |
|---|---|---|---|
| 5,646,943 A * | 7/1997 | Elwalid | 370/230 |
| 5,777,985 A | 7/1998 | Nakayama | |
| 5,933,414 A | 8/1999 | Georgiadis et al. | |
| 5,938,749 A * | 8/1999 | Rusu et al. | 710/54 |
| 6,105,070 A | 8/2000 | Gaylord | |
| 6,301,258 B1 | 10/2001 | Katseff et al. | |
| 6,360,271 B1 | 3/2002 | Schuster et al. | |
| 6,366,959 B1 | 4/2002 | Sidhu et al. | |
| 6,389,032 B1 | 5/2002 | Cohen | |
| 6,418,125 B1 | 7/2002 | Oran | |
| 6,452,950 B1 | 9/2002 | Ohlsson et al. | |
| 6,504,838 B1 | 1/2003 | Kwan | |
| 6,603,759 B1 | 8/2003 | Moskal et al. | |
| 6,658,027 B1 | 12/2003 | Kramer et al. | |
| 6,665,317 B1 | 12/2003 | Scott | |
| 6,683,889 B1 * | 1/2004 | Shaffer et al. | 370/516 |
| 6,684,273 B2 | 1/2004 | Boulandet et al. | |
| 6,700,895 B1 | 3/2004 | Kroll | |
| 6,704,329 B2 | 3/2004 | Martin | |
| 6,744,768 B2 | 6/2004 | Vikberg et al. | |
| 6,747,999 B1 | 6/2004 | Grosberg et al. | |
| 6,757,284 B1 | 6/2004 | Galles | |
| 6,765,931 B1 | 7/2004 | Rabenko et al. | |
| 6,788,651 B1 | 9/2004 | Brent et al. | |
| 6,829,244 B1 | 12/2004 | Wildfeuer et al. | |
| 6,859,460 B1 | 2/2005 | Chen | |
| 6,862,298 B1 * | 3/2005 | Smith et al. | 370/516 |
| 6,934,258 B1 | 8/2005 | Smith et al. | |
| 6,977,942 B2 | 12/2005 | Raisanen | |
| 6,988,169 B2 | 1/2006 | Burger et al. | |
| 7,027,456 B1 | 4/2006 | Chen | |

(Continued)

FOREIGN PATENT DOCUMENTS

WO 0193516 12/2001

OTHER PUBLICATIONS

"Introduction to Circuit Emulation Services over Ethernet" The Metro Ethernet Forum 2004.; http://www.metroethernetforum.org, pp. 1-6.

(Continued)

*Primary Examiner* — Kwang B Yao
*Assistant Examiner* — Obaidul Huq

(57) ABSTRACT

A jitter buffer system having a jitter buffer configured to buffer traffic and a control system coupled to the jitter buffer and configured to determine a first characteristic of the traffic in the jitter buffer, adjust the size of the jitter buffer by a constant when the first characteristic does not satisfy a first constraint for the first characteristic, determine a rate of adjusting the jitter buffer, and change the constant when the rate does not fall within a specified range.

15 Claims, 7 Drawing Sheets

U.S. PATENT DOCUMENTS

| | | |
|---|---|---|
| 7,079,486 B2 | 7/2006 | Colavito et al. |
| 7,088,677 B1 | 8/2006 | Burst, Jr. |
| 7,099,820 B1 | 8/2006 | Huart et al. |
| 7,110,422 B1 * | 9/2006 | Choudhury et al. .......... 370/516 |
| 7,246,057 B1 | 7/2007 | Sundqvist et al. |
| 7,359,324 B1 | 4/2008 | Ouellette et al. |
| 7,370,126 B2 | 5/2008 | FitzGerald |
| 7,426,221 B1 | 9/2008 | Cutaia |
| 7,477,661 B2 | 1/2009 | Scott |
| 7,496,086 B2 | 2/2009 | Eckberg |
| 7,573,894 B2 | 8/2009 | Schulz et al. |
| 7,599,399 B1 | 10/2009 | Bugenhagen |
| 7,630,307 B1 * | 12/2009 | Akinpelu et al. ............ 370/229 |
| 7,701,980 B1 | 4/2010 | Bugenhagen |
| 7,742,413 B1 | 6/2010 | Bugenhagen |
| 2002/0010885 A1 | 1/2002 | Ohuchi et al. |
| 2002/0167911 A1 | 11/2002 | Hickey |
| 2003/0026275 A1 | 2/2003 | Lanzafame et al. |
| 2003/0031210 A1 | 2/2003 | Harris |
| 2003/0058807 A1 | 3/2003 | Hoffmann |
| 2003/0086372 A1 | 5/2003 | Pate et al. |
| 2003/0120789 A1 | 6/2003 | Hepworth et al. |
| 2004/0073641 A1 | 4/2004 | Minhazuddin et al. |
| 2004/0218546 A1 | 11/2004 | Clark |
| 2005/0007952 A1 | 1/2005 | Scott |
| 2005/0047396 A1 | 3/2005 | Helm et al. |
| 2005/0053055 A1 | 3/2005 | Horvath et al. |
| 2005/0058146 A1 | 3/2005 | Liu et al. |
| 2005/0249115 A1 | 11/2005 | Toda et al. |
| 2006/0062216 A1 | 3/2006 | Li et al. |
| 2006/0075428 A1 | 4/2006 | Farmer et al. |
| 2006/0109856 A1 | 5/2006 | Deshpande |
| 2006/0251093 A1 | 11/2006 | Curcio et al. |

OTHER PUBLICATIONS

Peter Meyer, "Circuit Emulation Services-over-Packet and Cellular Backhaul," as published in analog Zone; Zarlink Semiconductor Packet Processing, pp. 1-6.

U.S. Appl. No. 11/073,200, filed Mar. 4, 2005.

U.S. Appl. No. 11/126,566, filed May 11, 2005.

* cited by examiner

ADAPTIVELY ADJUSTING JITTER BUFFER CHARACTERISTICS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to jitter buffers, an in particular, to dynamically controlling jitter buffers in communication networks.

2. Description of the Prior Art

The transfer of real-time or time sensitive communications over packet networks has become very common. For example, voice and video over packet (VoP) services are currently very popular. Other examples of transferring real-time packet services include gaming and audio services provided over packet networks.

One drawback to transferring real-time communications over packet networks is that traffic degradation frequently occurs due to congestion and network failures. Several other factors that service providers and network operators must contend with to combat traffic degradation include latency, jitter, and packet loss. The effect on end users of traffic degradation is a poor quality experience. Oftentimes end users will talk over each other, such as in the case of a two-way voice conversation. Other times, users will experience silence. Traffic degradation can also impact the operation of network equipment and can result in prematurely dropped calls.

Jitter buffers are commonly used to reduce traffic degradation. In a typical example, real-time communication traffic is received into a jitter buffer at an uneven rate. The jitter buffer includes a memory buffer of a certain size that buffers the incoming traffic. The jitter buffer then plays out the traffic at an even pace, thereby smoothing the traffic.

The smoothness of traffic and the delay associated with the traffic are directly related. Traffic smoothing will improve as the size of a jitter buffer increases. However, delay will also increase as the size of a jitter buffer increases. As the size of a jitter buffer is reduced, the quality of the smoothing will also be reduced. However, the delay will also shrink. A jitter buffer that is too large will create an undesirable amount of delay in the buffered traffic. A jitter buffer that is too small will increase the amount of packet loss associated with the buffered traffic, as packets will be discarded from the jitter buffer to create space for more incoming traffic.

Dynamic jitter buffers have been introduced in the prior art to reduce delay and packet loss. The size of dynamic jitter buffers can be increased or decreased as required by traffic conditions. Unfortunately, most prior art solutions for dynamically controlling jitter buffers are overly complex and therefore expensive. In addition, many prior art solutions often times adjust jitter buffers too frequently. Other times, jitter buffers are not adjusted often enough.

SUMMARY OF THE INVENTION

An embodiment of the invention helps solve the above problems and other problems by providing systems, methods, and software for controlling a jitter buffer based on, in part, monitoring an adjustment rate. Depending upon the adjustment rate, a constant by which the jitter buffer is adjusted can itself be adjusted.

In an embodiment of the invention, a jitter buffer system comprises a jitter buffer configured to buffer traffic and a control system coupled to the jitter buffer and configured to determine a first characteristic of the traffic in the jitter buffer, adjust a second characteristic of the jitter buffer by a constant when the first characteristic does not satisfy a first constraint for the first characteristic, determine a rate of adjusting the jitter buffer, and change the constant when the rate does not satisfy a second constraint for the rate.

In an embodiment of the invention, the first characteristic comprises an amount of time the traffic is delayed in the jitter buffer.

In an embodiment of the invention, the first characteristic comprises a level of packet loss of the traffic caused by buffering the traffic in the jitter buffer.

In an embodiment of the invention, changing the constant comprises increasing the constant.

In an embodiment of the invention, changing the constant comprises decreasing the constant.

In an embodiment of the invention, the rate of adjusting the jitter buffer comprises the number of times in a period that the second characteristic is adjusted.

In an embodiment of the invention, the second characteristic comprises the size of the jitter buffer.

In an embodiment of the invention, the traffic comprises voice over packet traffic.

BRIEF DESCRIPTION OF THE DRAWINGS

The same reference number represents the same element on all drawings.

DETAILED DESCRIPTION OF THE PREFERRED EMBODIMENT

FIGS. 1-7 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
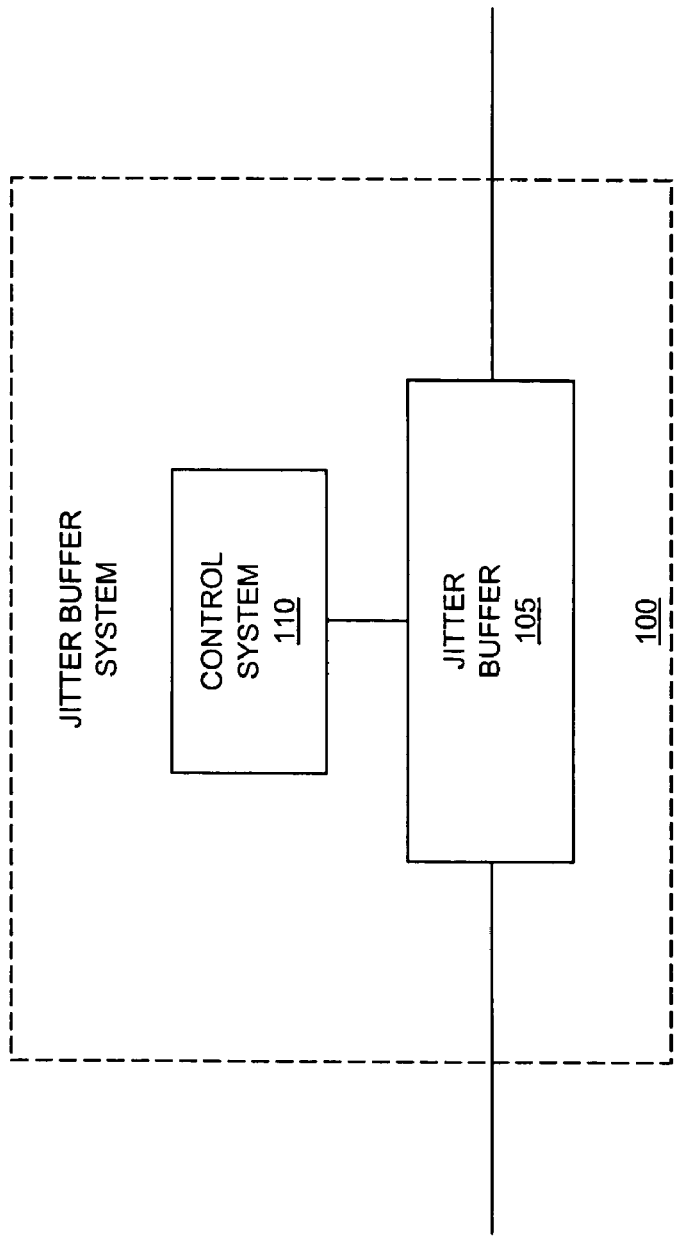
FIG. 1 illustrates a jitter buffer system in an embodiment of the invention.
Figure 2:
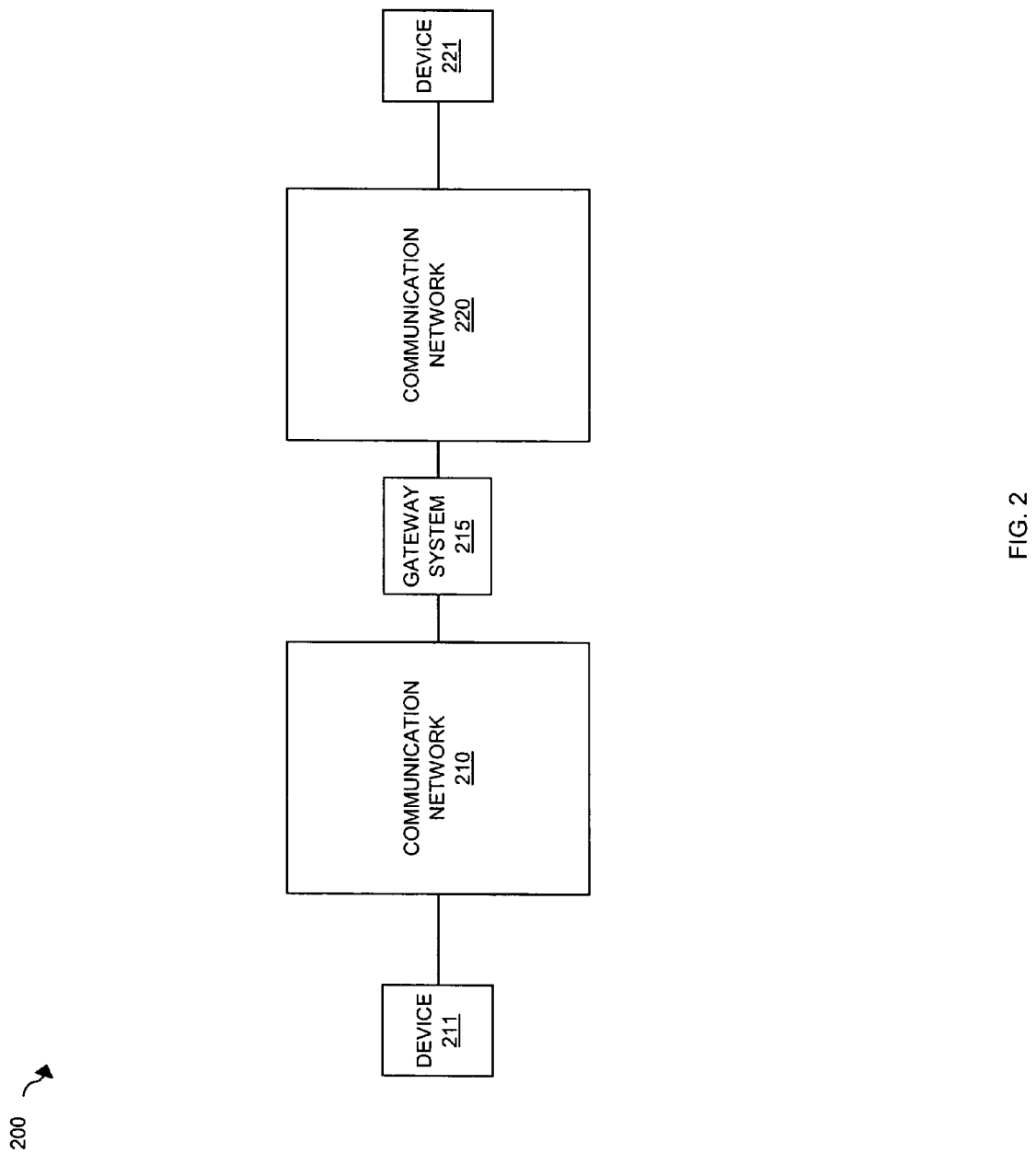
FIG. 2 illustrates a communication network in an embodiment of the invention.
Figure 3:
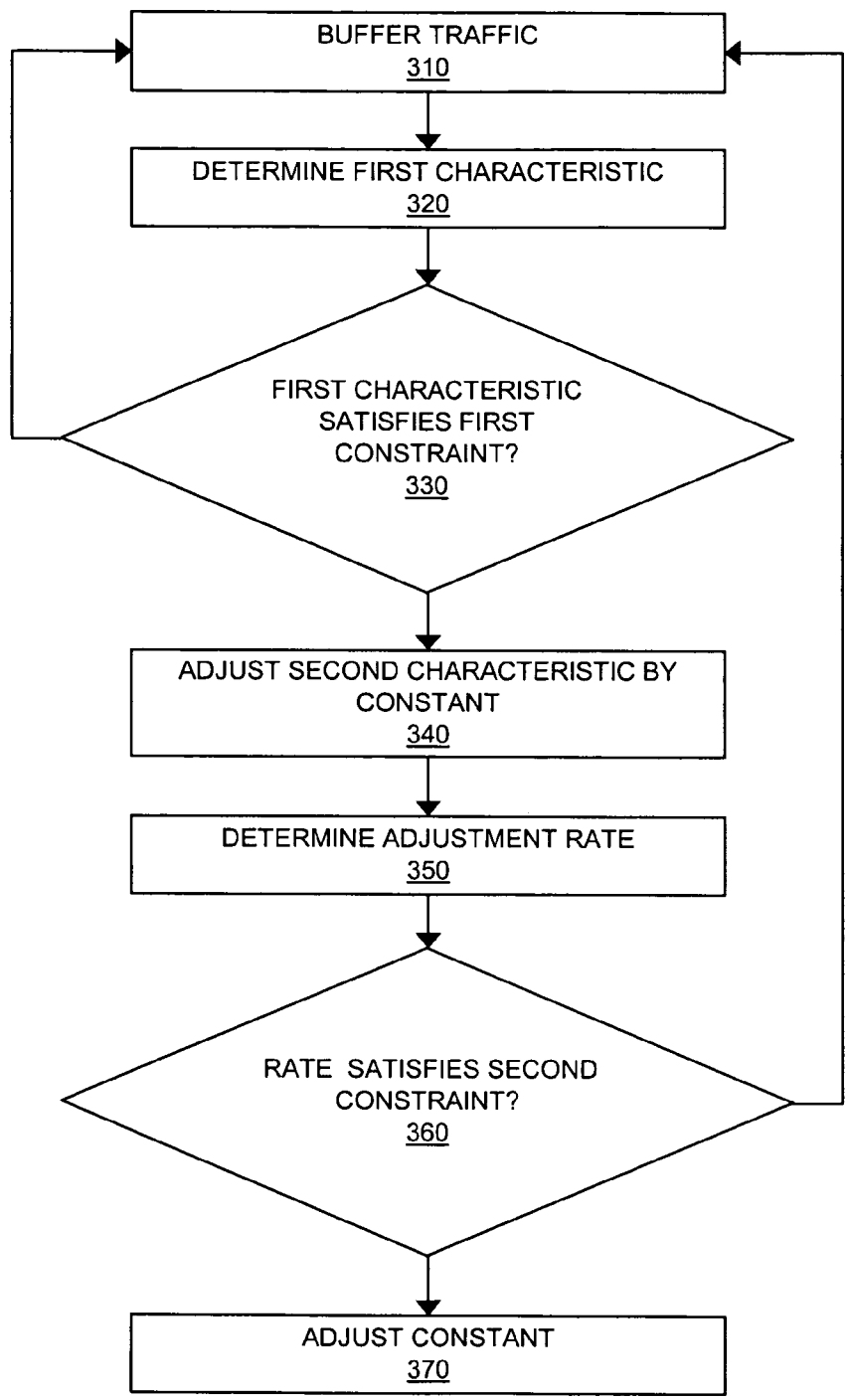
FIG. 3 illustrates the operation of a jitter buffer system in an embodiment of the invention.

First Embodiment Configuration and Operation—FIGS. 1-3

FIG. 1 illustrates jitter buffer system 100 in an embodiment of the invention. Jitter buffer system 100 includes jitter buffer 105 and control system 110. Control system 110 is operatively coupled to jitter buffer 105. Jitter buffer 105 could be any jitter buffer capable of receiving traffic from a system, buffering the traffic, and transferring the traffic to another system. Jitter buffer 105 could be a hardware device, a software process, or any combination thereof capable of buffering traffic to reduce or eliminate jitter. Control system 110 could be any system capable of dynamically controlling the configuration of jitter buffer 105 by determining a first characteristic of the traffic in jitter buffer 105, adjusting a second characteristic of jitter buffer 105 by a constant when the first characteristic does not satisfy a first constraint for the first characteristic, determining a rate of adjusting jitter buffer 105, and changing the constant when the rate does not satisfy a second constraint for the rate. Control system 110 could be implemented in hardware, software, or firmware, or any combination thereof.

FIG. 2 illustrates a communication network 200 in an embodiment of the invention. Communication network 200 includes device 211, communication network 210, gateway system 215, communication network 220, and device 221. In operation, device 211 communicates with device 221 for real-time sessions, such as voice calls, video streaming, gaming, and music downloads. Devices 211 and 221 could be communication devices, such as phones, pagers, personal digital assistants, and personal computers, as well as other types of devices. Devices 211 and 221 could also be service provider devices, such as a content server. Communication networks 210 and 220 could comprised of individual networks or a collection of networks. Communication networks 210 and 220 could be packet networks or non-packet networks, such as the public switched telephone network (PSTN). Gateway system 215 provided ingress and egress between communication network 210 and 220.

It should be understood that jitter buffer system 100, from FIG. 1, could be implemented in device 211, gateway system 215, or device 221, as well as in any other elements within communication networks 210 and 220.

In one example, communication network 210 could be a packet network, whereas communication network 220 could be a non-packet network. Further in this example, device 211 could be engaged in a voice session with device 221. Device 211 could be a packet-based communication device, such as a voice-over-packet enabled phone. Device 221 could be a standard plain-old-telephone service (POTS) phone.

In such an example, device 211 could transfer packet traffic over communication network 210 to gateway system 215. Gateway system 215 could include a jitter buffer system. Gateway system 215 could receive the packet traffic, buffer the packet traffic in the jitter buffer system, interwork the packet traffic to a time division multiplexed (TDM) format, and transfer the TDM traffic to device 221 over communication network 220. The resulting TDM traffic would be smoothed as a result of the buffering performed by the jitter buffer system.

Further in this example, device 211 could include a jitter buffer system. Device 211 could receive packet session traffic from gateway system 215 and buffer the traffic in the jitter buffer system for audio output to a user.

In yet another example, both communication network 210 and communication network 220 could be packet networks.

Further in this example, device 211 could engage in a voice-over-packet session with device 221. In such a case, both device 211 and device 221 could include jitter buffer systems that buffer the packet session traffic for audio output to a user.

FIG. 3 illustrates the operation of jitter buffer system 100 in an embodiment of the invention. It should be understood that jitter buffer system 100 could be implemented in other network elements and configurations other than those illustrated by FIG. 2. To begin, jitter buffer 105 buffers session traffic (Step 310). Control system 110 then determines a first characteristic of the traffic buffered in jitter buffer 105 (Step 320). For example, control system 110 could monitor the delay associated with the traffic. In another example, control system 110 monitors the packet loss rate of the traffic.

Next, control system 110 determines whether or not the first characteristic satisfies a first constraint for the first characteristic (Step 330). For example, the first constraint could be an acceptable level of delay against which the first characteristic is measured. In another example, the first constraint could be an acceptable level of packet loss against which the first characteristic is measured. When the first characteristic satisfies the first constraint, the operation of jitter buffer system 100 continues without modification. When the first characteristic does not satisfy the first constraint, control system 110 adjusts a second characteristic of jitter buffer 105 by a constant (Step 340). For example, control system 110 could increase or decrease the size of jitter buffer 105 by a constant size. In some cases, the constant could be indicated by an incremental amount of memory by which jitter buffer 105 is adjusted.

Upon adjusting the second characteristic of jitter buffer 105, control system 110 determines the rate at which the second characteristic has been adjusted (Step 350). For instance, the adjustment rate could comprise the number of times the second characteristic has been adjusted during a certain time period. Next, control system 110 determines if the adjustment rate satisfies a second constraint (Step 360). For example, the second constraint could be a benchmark range within which the adjustment rate could fall. If the adjustment rate satisfies the second constraint, jitter buffer system 100 continues operating normally. If the adjustment rate does not satisfy the second constraint, control system 110 adjusts the constant by which jitter buffer 105 is adjusted. For instance, control system 110 could increase or decrease the size of the constant by which the memory of jitter buffer 105 is incrementally adjusted.

In an operational example, control system 110 advantageously controls the size of jitter buffer 105 to keep traffic delay and packet loss within preferred parameters. It is well known that traffic delay can be increased by increasing the size of jitter buffer 105. However, packet loss will increase as the size of jitter buffer 105 is reduced. In one case, the rate at which traffic increases or decreases will impact the adjustment rate of jitter buffer 105. Traffic could increase at a first rate during a first time period. Traffic could increase at a second rate during a second time period, wherein the second rate is greater than the first rate. During the first time period, the constant by which the size of jitter buffer 105 is increased could suffice to reduce instances of packet loss. However, increasing the size of jitter buffer 105 by the same constant during the second time period might not suffice to reduce the instances of packet loss to a desirable level. Thus, control system 110 will increase the constant so that the size of jitter buffer 105 will reach a capacity sufficient enough to reduce packet loss In another case, traffic could decrease at a first rate during a first time period. Traffic could decrease at a second rate during a second time period, wherein the second rate is greater than the first rate. During the first time period, the constant by which the size of jitter buffer 105 is decreased could suffice to reduce delay to an acceptable level. However, decreasing the size of jitter buffer 105 by the same constant during the second time period might not suffice to reduce the instances of packet loss to an acceptable level. Thus, control system 110 will increase the constant so that the size of jitter buffer 105 will reach a size sufficient enough to reduce delay.

In either case, control system 110 determines whether or not a current constant is appropriate by tracking how often jitter buffer 105 must be adjusted. A relatively low adjustment rate indicates that the constant is appropriate. A relatively high adjustment rate indicates that the constant requires modification. The constant can be modified by increasing or decreasing the size of the constant.

In some cases, traffic may increase at a higher rate than previously experienced. In such a case, the adjustment rate would likely increase. The increase in the adjustment rate would trigger control system 110 to increase the constant, thereby reducing the adjustment rate. The increased constant would cause the size of jitter buffer 105 to be increased at a faster rater, thereby reducing packet loss faster than would otherwise occur had the constant remained the same.

In another case, traffic may increase at a slower rate than previously experienced. In such a case, the adjustment rate would likely decrease because the previous constant would create excess capacity within jitter buffer 105. In this case, the decreased adjustment rate would trigger control system 110 to decrease the constant. The decreased constant would cause the size of jitter buffer 105 to be increased at a lower rate. As a result, delay would be introduced at a slower rate than what would otherwise have occurred had the constant remained the same.

In yet another case, traffic may decrease at a higher rate than previously experienced. In such a case, the adjustment rate would likely increase. The increase in the adjustment rate would trigger control system 110 to increase the constant. The increased constant would cause the size of jitter buffer 105 to be reduced at a faster rate than previously. As a result, delay would be reduced faster than what would otherwise have occurred had the constant remained the same.

In yet another case, traffic may decrease at a slower rate than previously experienced. In such a case, the adjustment rate would likely decrease because the previous constant would cause the size of jitter buffer 105 to be reduced too quickly. In this case, the decreased adjustment rate would trigger control system 110 to decrease the constant. The decreased constant would cause the size of jitter buffer 105 to be decreased at a lower rate. As a result, packet loss would be introduced at a slower rate than what would otherwise have occurred had the constant remained the same.

It should be understood that the benchmark adjustment rate against which the actual adjustment rate is measured in FIG. 3 could be determined based on historical performance. For example, control system 110 could compare the current adjustment rate against historical adjustment rates for a particular time of day, day of week, or time of year. In such an example, control system 110 could determine the current benchmark rate for the current time of day, day of week, or time of year and compare the current benchmark rate to the actual adjustment rate. In another example, the benchmark adjustment rate could be a static rate based on pre-determined performance requirements. Other types of benchmark adjustment rates are possible.

Figure 4:
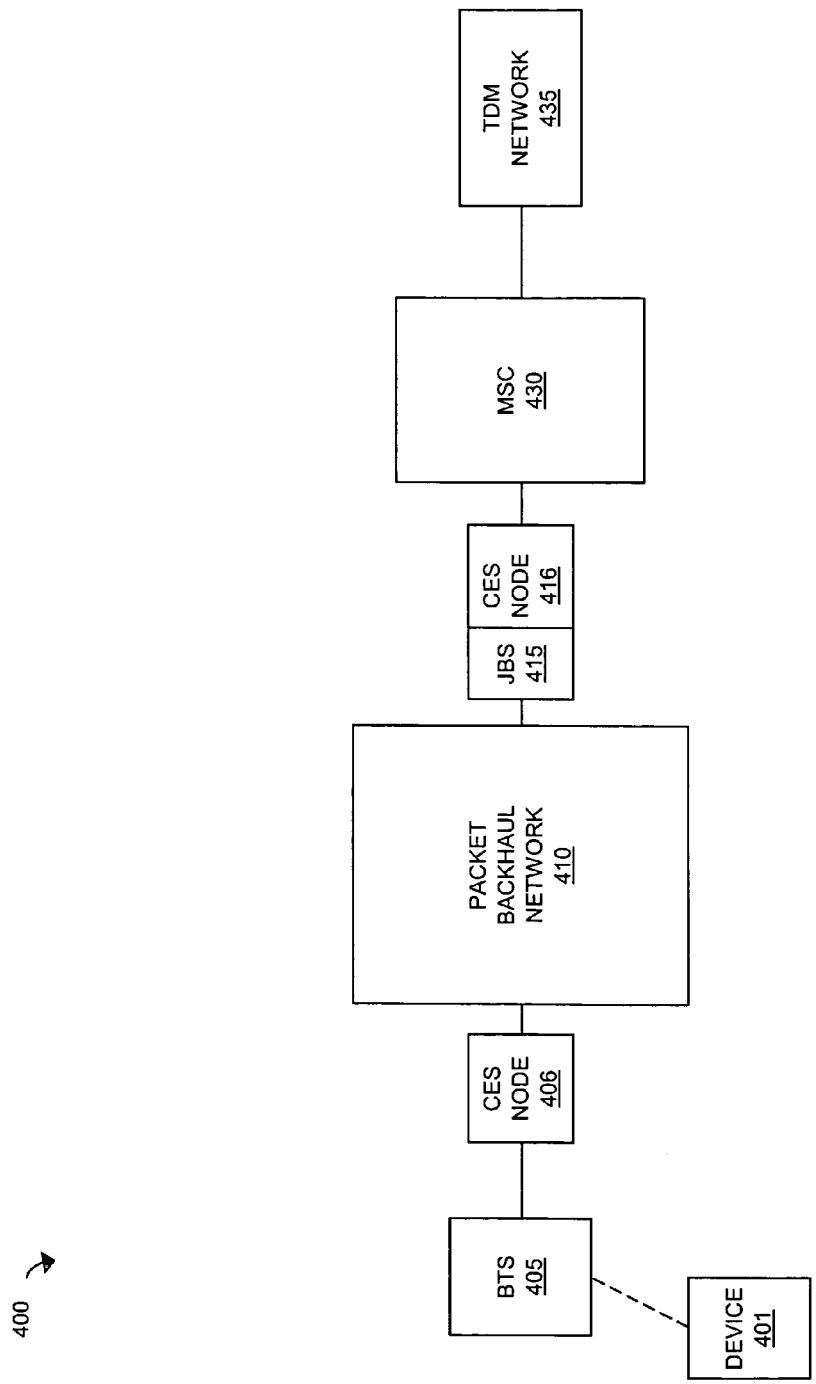
FIG. 4 illustrates a communication network in an embodiment of the invention.
Figure 5:
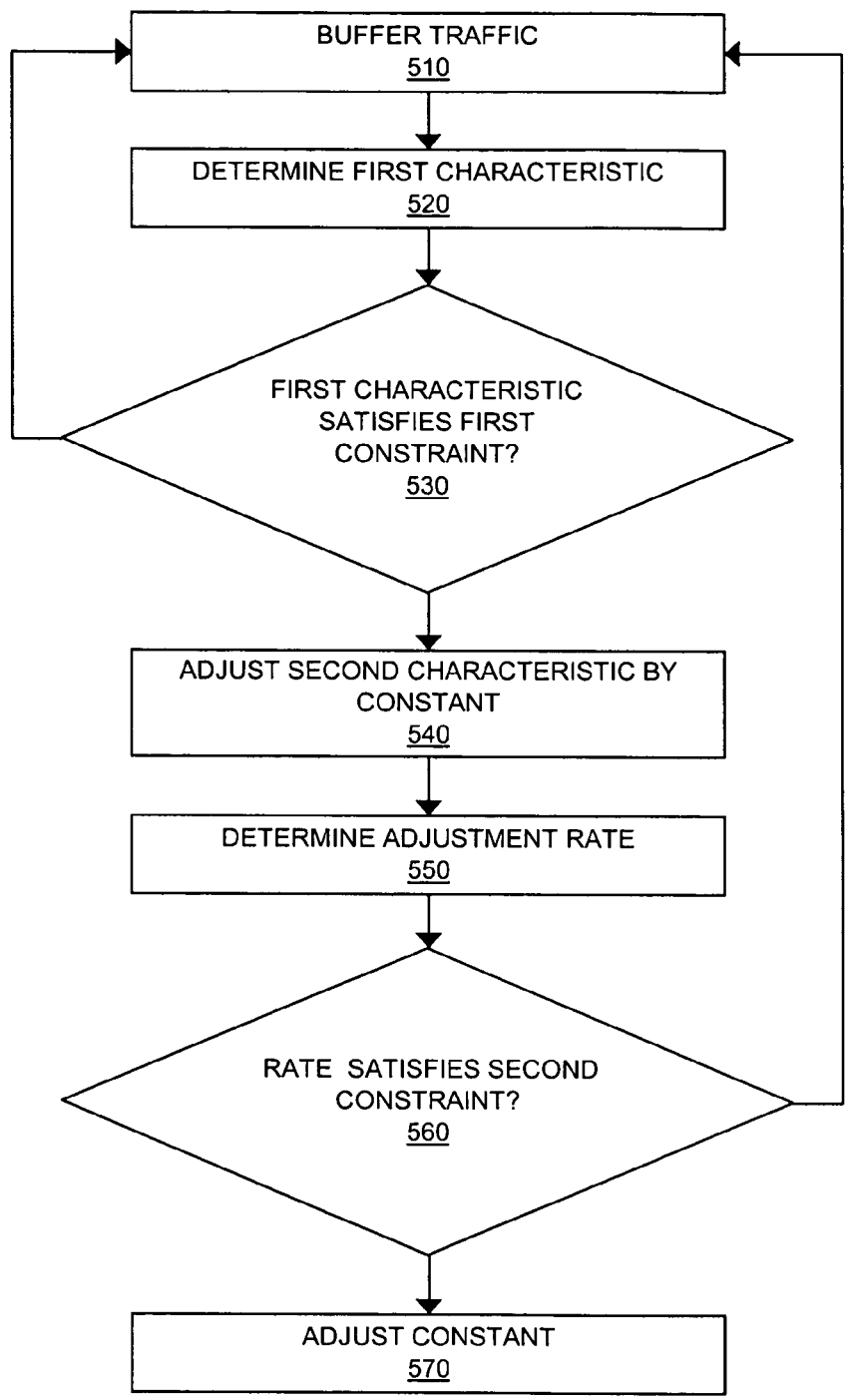
FIG. 5 illustrates the operation of a jitter buffer system in an embodiment of the invention.

Second Embodiment Configuration and Operation—FIGS. 4 and 5

FIG. 4 illustrates communication network 400 in an embodiment of the invention. Communication network 400 includes device 401, base station transceiver system (BTS) 405, packet backhaul network 410, mobile switching center (MSC) 430, and TDM network 435. Communication network 400 also includes circuit emulation service (CES) nodes 406 and 416. CES node 416 includes jitter buffer system 415. Jitter buffer system 415 could include a jitter buffer and a control system.

In this embodiment, device 401 could be a wireless device, such as a wireless phone. Device 401 communicates wirelessly with BTS 405 in accordance with well known wireless protocols, such as code division multiple access (CDMA) and general service mobile (GSM). Device 401 typically exchanges TDM communications with BTS 405. Packet backhaul network 410 links BTS 405 to MSC 430 by carrying traffic in a packet format. CES nodes 406 and 416 convert TDM traffic to the packet format for transport over packet backhaul network 410. MSC 430 performs call handling and switching functions.

In the normal course of operation, a user places a call from device 401 to a destination on TDM network 435. TDM network 435 could be, for example, the public switched telephone network (PSTN). Device 401 transmits wireless communications for the call to BTS 405. BTS 405 receives and transfers the communications in a TDM format to CES node 406. CES node 406 processes the communications to place the communications in a packet format suitable for transport over packet backhaul network 410. The packet communications arrive at CES node 416. Upon arriving at CES node 416, jitter buffer system (JBS) 415 buffers the communications. The buffered packet communications are then converted at CES node 416 to a TDM format and transferred to MSC 430. While CES node 416 is pictured external to MSC 430, it could be located internally. MSC 430 then switches the TDM communications to an outgoing line or trunk to TDM network 435.

FIG. 5 illustrates the operation of JBS 415 in an embodiment of the invention. To begin, the jitter buffer buffers call traffic (Step 510). The control system then determines a first characteristic of the traffic buffered in the jitter buffer (Step 520). For example, the control system could monitor the delay associated with the traffic. In another example, the control system monitors the packet loss rate of the traffic.

Next, the control system determines whether or not the first characteristic satisfies a first constraint for the first characteristic (Step 530). For example, the first constraint could be an acceptable level of delay against which the first characteristic is measured. In another example, the first constraint could be an acceptable level of packet loss against which the first characteristic is measured. When the first characteristic satisfies the first constraint, the operation of JBS 415 continues without modification. When the first characteristic does not satisfy the first constraint, the control system adjusts a second characteristic of the jitter buffer by a constant (Step 540). For example, the control system could increase or decrease the size of the jitter buffer by a constant size. In some cases, the constant could be indicated by an incremental amount of memory by which the jitter buffer is adjusted.

Upon adjusting the second characteristic of the jitter buffer, the control system determines the rate at which the second characteristic has been adjusted (Step 550). For instance, the adjustment rate could comprise the number of times the second characteristic has been adjusted during a certain time period. Next, the control system determines if the adjustment rate satisfies a second constraint (Step 560). For example, the second constraint could be a benchmark range within which the adjustment rate could fall. If the adjustment rate satisfies the second constraint, JBS 415 continues operating normally. If the adjustment rate does not satisfy the second constraint, the control system adjusts the constant by which the jitter buffer is adjusted. For instance, the control system could increase or decrease the size of the constant by which the memory of the jitter buffer is incrementally adjusted.

Figure 6:
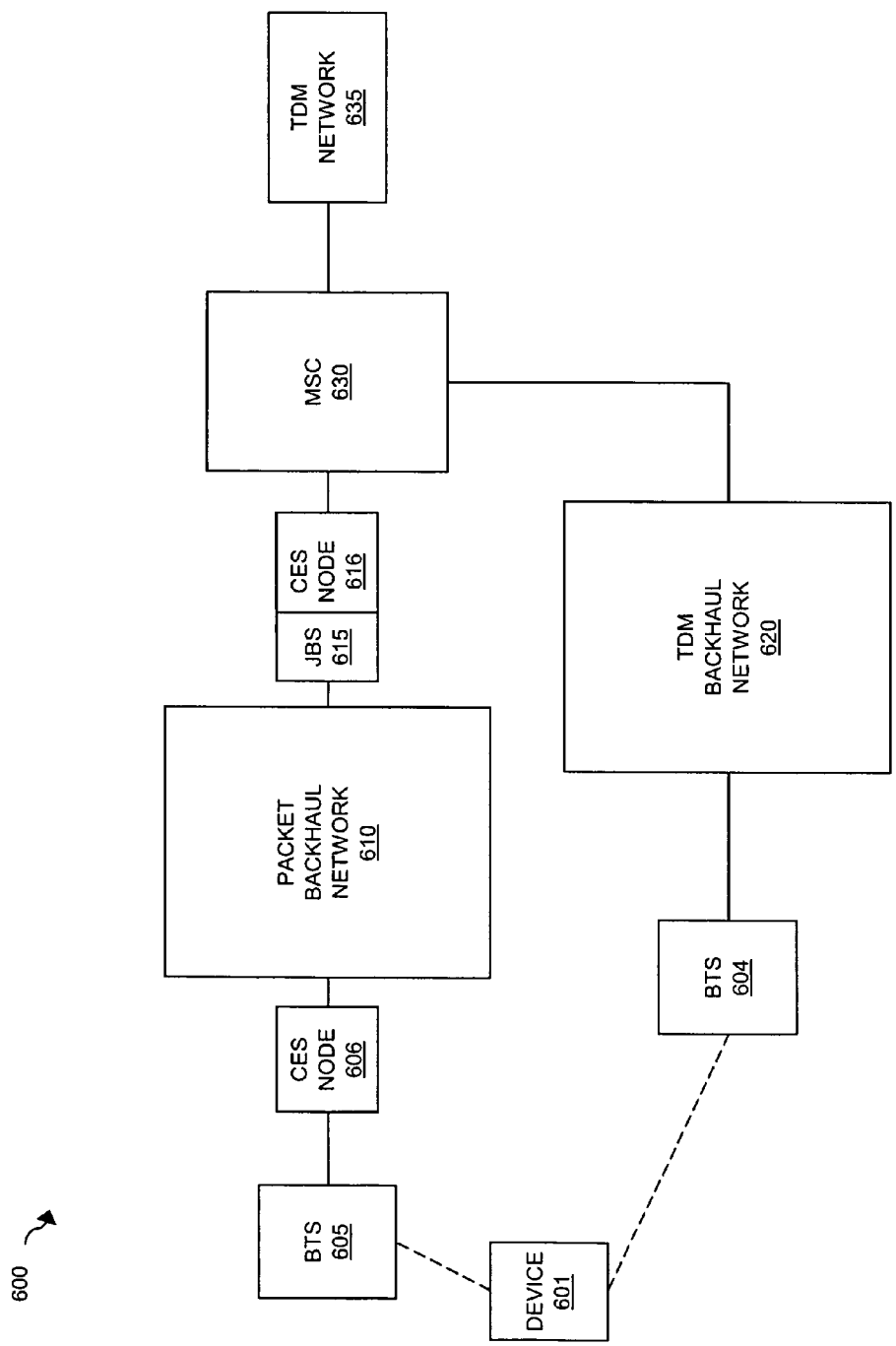
FIG. 6 illustrates a communication network in an embodiment of the invention.
Figure 7:
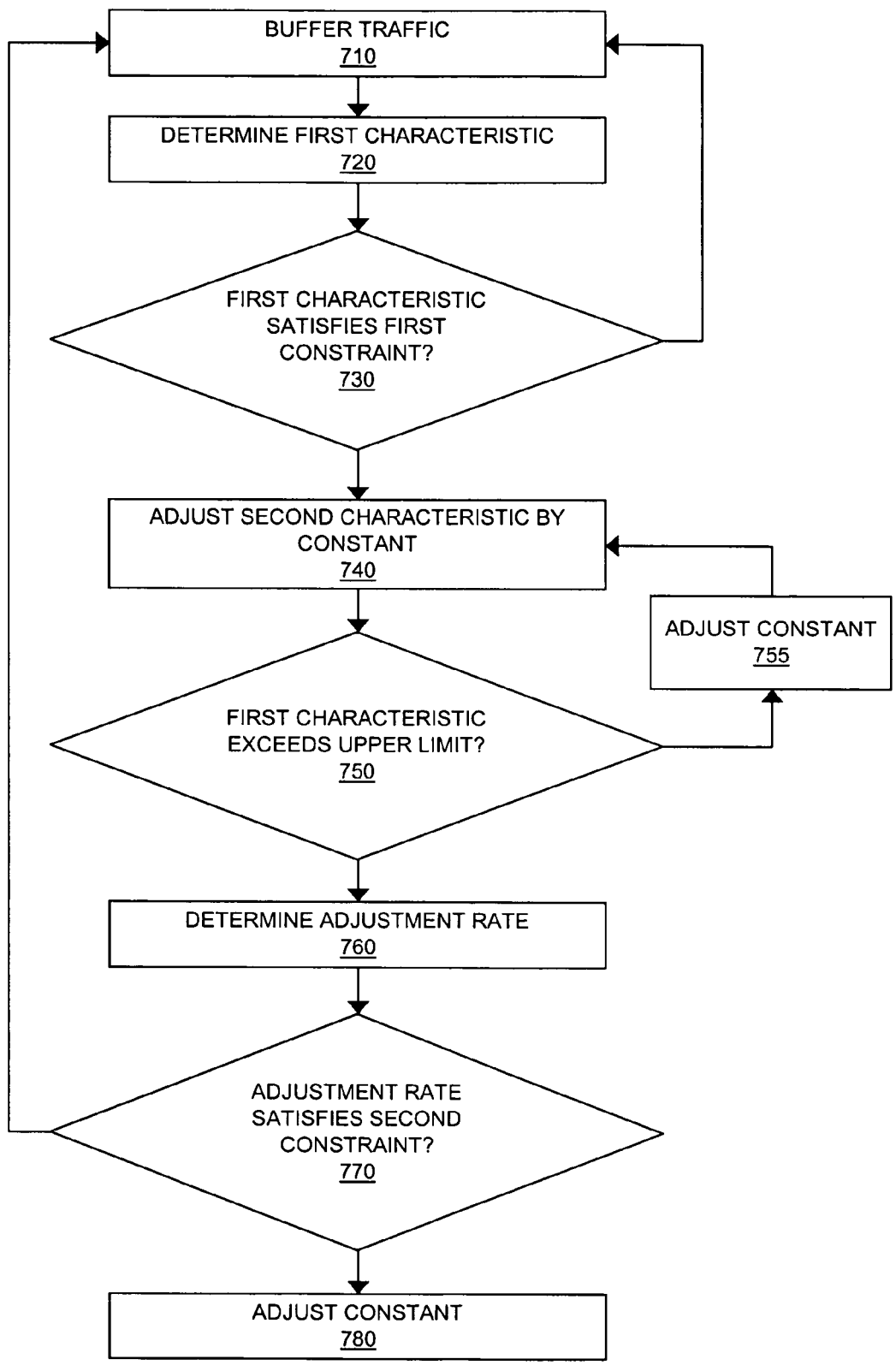
FIG. 7 illustrates the operation of a jitter buffer system in an embodiment of the invention.

Third Embodiment Configuration and Operation—FIGS. 6 and 7

FIG. 6 illustrates communication network 600 in an embodiment of the invention. Communication network 600 includes device 601, base station transceiver system (BTS) 604 and BTS 605, packet backhaul network 610, time division multiplexed (TDM) backhaul network 620, mobile switching center (MSC) 630, and TDM network 635. Communication network 600 also includes circuit emulation service (CES) nodes 606 and 616. CES node 616 includes jitter buffer system 615. Jitter buffer system 615 could include a jitter buffer and a control system.

In this embodiment, device 601 could be a wireless device, such as a wireless phone. Device 601 communicates wirelessly with BTS 605 and BTS 604 in accordance with well known wireless protocols, such as code division multiple access (CDMA) and general service mobile (GSM). Device 601 typically exchanges TDM communications with BTSs 604 and 605. TDM backhaul network 620 links BTS 604 with MSC 630 by carrying communications in a TDM format. Packet backhaul network 610 links BTS 605 to MSC 630 by carrying traffic in a packet format. CES nodes 606 and 616 convert TDM traffic to the packet format for transport over packet backhaul network 610. MSC 630 performs call handling and switching functions, including call hand-offs between BTSs 604 and 605.

In the normal course of operation, a user places a call from device 601 to a destination on TDM network 635. TDM network 635 could be, for example, the public switched telephone network (PSTN). Initially, the call is handled by BTS 605. Device 601 transmits wireless communications to BTS 605. BTS 605 receives and transfers the communications to CES node 606. CES node 606 processes the communications to place the communications in a packet format suitable for transport over packet backhaul network 610. The packet communications arrive at CES node 616. Upon arriving at CES node 616, jitter buffer system (JBS) 615 buffers the communications. The buffered packet communications are then converted at CES node 616 to a TDM format and transferred to MSC 630. While CES node 616 is pictured external to MSC 630, it could be located internally. MSC 630 then switches the TDM communications to an outgoing line or trunk to TDM network 635.

Eventually, the user roams to an area serviced by both BTS 605 and BTS 604. From the perspective of MSC 630, traffic arriving from packet backhaul network 610 has a different amount of delay than traffic arriving from TDM backhaul network 620. The delay differential is primarily caused by different network characteristics between packet backhaul network 610 and TDM backhaul network 620. The performance of JBS 615 adds to the delay caused by packet backhaul network 610. It is therefore important to regulate the performance of JBS 615 to maintain the overall delay within acceptable parameters. In particular, the overall delay for traffic received over packet backhaul network 610 must be maintained within an acceptable range with respect to traffic received over TDM backhaul network 620. In this manner, call handling operations, such as hand-offs, can be executed without significant error.

FIG. 7 illustrates the operation of JBS 615 in an embodiment whereby a jitter buffer is dynamically controlled to compensate for traffic conditions and to account for upper limits imposed based on external factors, such as complementary backhaul networks. To begin, packet traffic is received into the jitter buffer of JBS 615 (Step 710). The jitter buffer buffers the traffic for smoothing purposes. The control system determines a first characteristic of the traffic, such as the incremental delay added to the overall delay of the traffic by the buffering process (Step 720).

Next, the control system determines if the first characteristic satisfies a first constraint (Step 730). For instance, the control system could check whether or not the traffic delay falls within an acceptable range. If so, the operation of JBS 615 continues. If not, a second characteristic of the jitter buffer, such as its size, is adjusted by a constant amount (Step 740).

After adjusting the second characteristic, the control system checks whether the new status of the first characteristic exceeds an upper limit (Step 750). The upper limit could be based on criteria associated with TDM backhaul network 620, such as the amount of delay incurred by traffic traversing TDM backhaul network 620. For example, a total differential delay amount could be allowed between traffic received into MSC 630 from CES node 616 and TDM backhaul network 620. If the delay associated with packet backhaul network 610 is known, and if the delay associated with TDM backhaul network 620 is known, then it can be determined how much delay JBS 615 is allowed to add to traffic destined for MSC 630. The first characteristic could be checked against this upper limit to ensure that the differential delay between packet traffic and TDM traffic does not become too great. In an alternative, the first characteristic could be checked against an absolute delay level for packet backhaul network 610, rather than computing the differential delay between packet traffic and TDM traffic.

If the first characteristic exceeds the upper limit, the constant by which the jitter buffer is adjusted can itself be adjusted (Step 755). For instance, the constant could be increased or reduced. The second characteristic could then be re-adjusted using the newly adjusted constant. If the first characteristic does not exceed the upper limit, the adjustment rate is determined (Step 760).

Next, the control system determines whether or not the adjustment rate satisfies a second constraint (Step 770). If so, the normal operation of JBS 615 continues. If not, the constant is once again adjusted (Step 780). For example, the constant could be increased of decreased. Upon adjusting the constant, JBS 615 returns to buffering traffic (Step 710). The process can continue indefinitely.

In this manner, the overall delay of traffic for a call traversing packet backhaul network 610 will remain within a range acceptable with respect to traffic for the same call that traverses TDM backhaul network. As the user roams from BTS 605 to BTs 604, MSC 630 will be able to hand-off the call if the delay differential is within the acceptable range. Otherwise, MSC 630 might drop the call if the delay differential is so great that it is not apparent to MSC 630 that two BTSs are participating on the call.

What is claimed is:

1. A method of operating a control system to dynamically control a jitter buffer in a communication network, the method comprising:

buffering traffic in the jitter buffer;
determining a first characteristic of the traffic in the jitter buffer;
adjusting a size of the jitter buffer by a constant when the first characteristic does not satisfy a first constraint for the first characteristic, wherein the constant indicates an incremental amount of memory in the jitter buffer;
determining a rate of adjusting the size of the jitter buffer by the constant; and
changing the constant when the rate is not within a specified range.

2. The method of claim 1 wherein the first characteristic comprises an amount of time the traffic is delayed in the jitter buffer.

3. The method of claim 1 wherein the first characteristic comprises a level of packet loss of the traffic caused by buffering the traffic in the jitter buffer.

4. The method of claim 1 wherein changing the constant comprises increasing the constant.

5. The method of claim 1 wherein changing the constant comprises decreasing the constant.

6. The method of claim 1 wherein the rate of adjusting the jitter buffer comprises the number of times in a period that the size of the jitter buffer is adjusted.

7. The method of claim 1 wherein the traffic comprises voice over packet traffic.

8. A jitter buffer system comprising:
a jitter buffer configured to buffer traffic; and
a control system coupled to the jitter buffer and configured to determine a first characteristic of the traffic in the jitter buffer, adjust a size of the jitter buffer by a constant when the first characteristic does not satisfy a first constraint for the first characteristic, determine a rate of adjusting the size of the jitter buffer by the constant, and change the constant when the rate is not within a specified range, wherein the constant indicates an incremental amount of memory in the jitter buffer.

9. The jitter buffer system of claim 8 wherein the first characteristic comprises an amount of time the traffic is delayed in the jitter buffer.

10. The jitter buffer system of claim 8 wherein the first characteristic comprises a level of packet loss of the traffic caused by buffering the traffic in the jitter buffer.

11. The jitter buffer system of claim 8 wherein changing the constant comprises increasing the constant.

12. The jitter buffer system of claim 8 wherein changing the constant comprises decreasing the constant.

13. The jitter buffer system of claim 8 wherein the rate of adjusting the jitter buffer comprises the number of times in a period that the size of the jitter buffer is adjusted.

14. The jitter buffer system of claim 8 wherein the traffic comprises voice over packet traffic.

15. A non-transitory computer-readable medium having instructions stored thereon for operating a control system, wherein the instructions, when executed by a processing system, direct the processing system to determine a first characteristic of traffic buffered in a jitter buffer, adjust a size of the jitter buffer by a constant when the first characteristic does not satisfy a first constraint for the first characteristic, determine a rate of adjusting the size of the jitter buffer by the constant, and change the constant when the rate is not within a specified range, wherein the constant indicates an incremental amount of memory in the jitter buffer.

\* \* \* \* \*